United States Patent Office 3,483,712
Patented Dec. 16, 1969

3,483,712
MULTIPLE MOLD FOR A FREEZING MACHINE
Hans Gram, Vojens, Denmark, assignor to Brodrene
Gram A/S, Vojens, Denmark
Filed Mar. 19, 1968, Ser. No. 714,190
Claims priority, application Denmark, Mar. 21, 1967,
1,475/67
Int. Cl. F25c 1/04
U.S. Cl. 62—356         4 Claims

ABSTRACT OF THE DISCLOSURE

Freezing pockets extend through holes of a freezing table and similar holes of a baffle plate provided a short distance under the freezing table, the freezing pockets fitting loosely in the holes of both plates and depending into a violently circulating freezing liquid in a vessel located under the baffle plate, drain passage means being connected to the interspace between the freezing table and the baffle plate.

BACKGROUND OF THE INVENTION

The invention relates to a multiple mold for a freezing machine, and more particularly a mold of the kind comprising a supporting plate having a multitude of holes in which freezing pockets are mounted so as to depend from the supporting plate.

As an example of a freezing machine to which the invention may be applied, reference may be made to an ice cream freezer of the revolving type having an annular vessel into which the freezing pockets depend and in which a freezing liquid, e.g. brine, is circulated.

In the known multiple molds of the kind referred to, the freezing pockets are brazed or soldered to the supporting plate along the peripheries of the holes thereof. If a freezing pocket becomes leaky or deformed, the whole mold must be removed from the freezing machine to apply heat to remove the damaged freezing pocket from the supporting plate and to fuse a new freezing pocket thereto in its place, whereafter the mold must again be applied to the freezing machine. This procedure is rather time consuming and expensive. The problem referred to cannot be solved just by mounting the freezing pockets detachably in the holes of the supporting plates, because there would then inevitably occur some leakage between at least some of the freezing pockets and the supporting plate, and since the freezing liquid is generally violently circulated under the supporting plate, freezing liquid may leak to the surface of the supporting plate and from there into the freezing pockets to spoil the material to be frozen therein.

It is the object of the invention to provide a multiple mold of the kind referred to in which the freezing pockets are readily exchangeable without involving any danger of freezing liquid leaking through the joints between the freezing pockets and the supporting plate to the surface of the latter and into the freezing pockets.

SUMMARY OF THE INVENTION

According to the invention, a multiple mold for a freezing machine comprises a supporting plate having a multitude of holes, freezing pockets removably fitted in said holes to depend therefrom, a baffle plate mounted below said supporting plate at a spacing therefrom to form an interspace between said supporting plate and said baffle plate, said baffle plate having holes fitting around said depending freezing pockets, and drain passage means communicating with said interspace.

With this construction, freezing pockets may readily be removed from and placed in the holes of the supporting plate, and still there is no danger of harmful leakage of freezing liquid because any freezing liquid that may leak through the inevitable spaces between the freezing pockets and the edges of the holes of the baffle plate will thereby lose its kinetic energy owing to the flow resistance encountered in said spaces and will therefore not penetrate through the spaces between the freezing pockets and the supporting plate but will flow slowly along the surface of the baffle plate to the drain passage means to escape therethrough at a rate sufficient to prevent the liquid above the baffle plate from rising to a level above the tops of the freezing pockets.

Each of the holes of the supporting plate may be surrounded by an upwardly extending collar, and the freezing pockets may be constructed at their upper edge with downturned lugs for engaging said collars from the exterior. In this manner, the freezing pockets are additionally protected against the penetration of freezing liquid.

The freezing pockets must of course be prevented from being pushed up through the holes of the supporting plate under the influence of their buoyancy and any upward forces resulting from the flow of the freezing liquid. This may be obtained by any suitable form of holding or detaining means. According to a preferred embodiment of the invention, where the freezing pockets are arranged in rows, the pockets in each row may be interconnected at their tops by means of bridge pieces extending between adjacent marginal portions of successive pockets in the row, the endmost pockets in each row being provided at their tops with fastening lugs extending away from the row. By this arrangement all the freezing pockets of a row may be locked in position by clamping the two fastening lugs of the row to the supporting plate, e.g. by means of wing fasteners. If a freezing pocket becomes damaged, the row to which it belongs may be removed from the supporting plate and may be replaced by a new row. A supply of such rows of freezing pockets may be kept in store, and thus the replacement will be a simple operation that does not necessitate any dismounting or repair work.

DESCRIPTION OF THE PREFERRED EMBODIMENT

Figure 1:
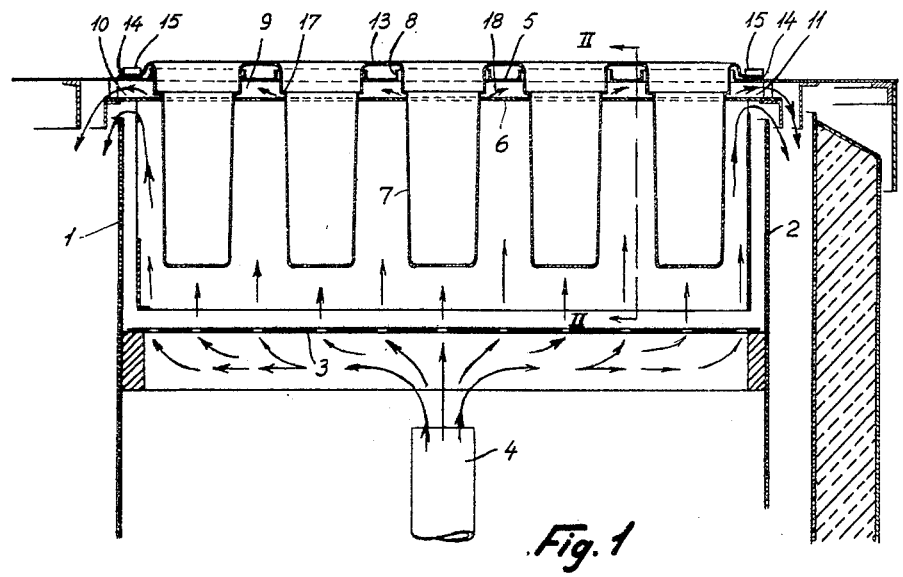
FIGURE 1 shows a fractional radial section through an ice cream freezing machine with a multiple mold in accordance with one embodiment of the invention, and FIGURE 2 a fractional section along the line II—II in FIGURE 1.

The freezing machine illustrated in the drawing comprises a freezing vessel having an inner cylindrical wall 1, an outer cylindrical wall 2 and a perporated bottom plate 3, which is annular when viewed in plan view. The upper edges of the walls 1 and 2 form an overflow for freezing liquid which is supplied to the freezing vessel through a pipe 4.

The machine also comprises a rotatable freezing table, which constitutes a multiple mold and consists of a supporting plate 5, a baffle plate 6 and freezing pockets 7. The upper ends of the freezing pockets 7 are received in holes of the supporting plate 5, each of which holes is surrounded by an upwardly extending collar 8. In the baffle plate 6 a similar pattern of holes is provided and the baffle plate is placed under the supporting plate 5 in a position such that the two sets of holes register with one another. The size of the holes of the baffle plate 6 substantially corresponds to the contour of the freezing pockets 7. The baffle plate 6 is located at a small distance below the supporting plate 5 so that an interspace 9 is formed between the two plates which interspace communicates with drain passages 10 and 11.

Figure 2:
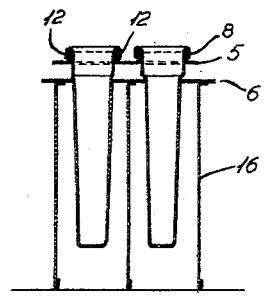

At their upper edges the freezing pockets 7 are constructed with downturned lugs 12, FIGURE 2. In the embodiment illustrated, each freezing pocket has such a lug 12 at two opposite sides. These lugs engage the collars 8 from the exterior as is apparent from FIGURE 2.

The holes of the supporting plate are arranged in radial rows, and FIGURE 1 shows a section through such a row. The freezing pockets of each row are interconnected at their upper edges by means of bridge pieces 13. These bridge pieces 13 extend from adjacent sides of successive freezing pockets 7 and interconnect all freezing pockets of the row so as to form a cohered row of freezing pockets.

At the upper edge of the two outermost freezing pockets 2 of each row, a fastening lug 14 is provided, which serves for fastening the whole of the radial row to the upper surface of the supporting plate 5, the two fastening lugs e.g. being clamped against the upper surface of the supporting plate by means of wing fasteners 15 or other suitable fastening means.

Between the radial rows of freezing pockets, partitions 16 are provided, which are secured to the underside of the baffle plate 6.

In the embodiment illustrated, each freezing pocket 7 is constructed with a shoulder 17 immediately above the baffle plate 6, the upper portion of the freezing pocket having a greater width than the lower portion of the freezing pocket.

The machine illustrated in the drawing operates as follows:

Freezing liquid is continuously supplied to the freezing vessel 1, 2, 3 as indicated by the arrows in FIGURE 1. At the same time the freezing table with the freezing pockets 7 is rotated, e.g. step by step, in the circumferential direction of the freezing vessel by means not shown in the drawing. The freezing liquid is supplied at a relatively high pressure, whereby a violent circulation of freezing liquid is produced in the compartments formed between the partitions 16, whereby the freezing pockets 7 are intimately swept by the freezing liquid. Owing to the violent circulation the freezing liquid will still have a considerable kinetic energy at the upper ends of the freezing pockets, and freezing liquid will therefore leak to the interspace 9 between the supporting plate 5 and the baffle plate 6, the leakage taking place through the inevitable small spaces between the edges of the holes of the baffle plate 6 and the outer surfaces of the freezing pockets 7. However, the narrow spaces will produce a so strong resistance to the freezing liquid flowing therethrough that the speed at which the freezing liquid penetrates into the interspace 9, will be very low so that the freezing liquid may escape through the drain passages 10 and 11 at a rate sufficient to prevent the level of the liquid from rising above the upper edges of the collars 8. In the embodiment shown, the shoulders 7 will additionally cause the freezing liquid penetrating into the interspace 9 to be deflected substantially to horizontal direction as indicated by arrows 18. The kinetic energy that may still be left in the freezing liquid will therefore not cause the liquid to flow upwards in the direction of the upper edges of the collars 8.

If the freezing pocket becomes damaged, it may easily be replaced by turning the wing fasteners 14, removing the respective row of freezing pockets and inserting a new row in its place.

I claim:

1. A multiple mold for a freezing machine, comprising a suporting plate having a multitude of holes, freezing pockets removably fitted in said holes to depend therefrom, a baffle plate mounted below said supporting plate at a spacing therefrom to form an interspace between said supporting plate and said baffle plate, said baffle plate having holes fitting around said depending freezing pockets, drain passage means communicating with said interspace, and means for circulating freezing liquid against said freezing pockets below said baffle.

2. A mold as in claim 1, in which each hole of said supporting plate is surrounded by an upwardly extending collar, and said freezing pockets are constructed at their upper edge with downturned lugs for engaging said collars from the exterior.

3. A mold as in claim 1, in which said freezing pockets are arranged in rows, and the pockets in each row are interconnected at their tops by means of bridge pieces extending between adjacent marginal portions of successive pockets in the row, the endmost pockets in each row being provided at their tops with fastening lugs extending away from the row.

4. A mold as in claim 1, in which each freezing pocket is constructed with a shoulder immediately above said baffle plate.

References Cited
UNITED STATES PATENTS

| | | | |
|---|---|---|---|
| 1,734,765 | 11/1929 | Epperson | 62—374 X |
| 3,024,622 | 3/1962 | Gram | 62—356 X |
| 3,261,178 | 7/1966 | Okada | 62—345 |

WILLIAM E. WAYNER, Primary Examiner

U.S. Cl. X.R.

107—8